United States Patent [19]

Olson et al.

[11] Patent Number: 4,611,026

[45] Date of Patent: Sep. 9, 1986

[54] EMULSION AND DISPERSION COMPRISING CROSS-LINKED POLYMERIC MICROGEL PREPARED FROM POLYMERIZING EPOXY-CONTAINING MONOMER IN THE PRESENCE OF AN ACID

[75] Inventors: Kurt G. Olson, Gibsonia; Suryya K. Das, Pittsburgh; Rostyslaw Dowbenko, Gibsonia, all of Pa.

[73] Assignee: PPG Industries, Inc., Pittsburgh, Pa.

[21] Appl. No.: 747,542

[22] Filed: Jun. 21, 1985

Related U.S. Application Data

[62] Division of Ser. No. 482,117, Apr. 4, 1983, Pat. No. 4,540,740.

[51] Int. Cl.$^4$ ............................................. C08F 12/22
[52] U.S. Cl. .................................... 524/548; 524/801; 524/811
[58] Field of Search ..................... 524/548, 801, 811; 526/273

[56] References Cited

U.S. PATENT DOCUMENTS 3,440,200  4/1969  Lindemann et al. ............... 526/273
4,180,619  12/1979  Makhlouf et al. .................. 526/273

*Primary Examiner*—Harry Wong, Jr.
*Attorney, Agent, or Firm*—William J. Uhl

[57] ABSTRACT

A process for preparing polymeric microgel by aqueous dispersion polymerization techniques is disclosed. The emulsion can be inverted into organic diluent, and the water removed to form a dispersion of the microgel in the organic diluent. The microgel can be formulated into coating compositions where it improves the sag resistance and metallic pigment pattern control of the coating composition.

10 Claims, No Drawings

EMULSION AND DISPERSION COMPRISING CROSS-LINKED POLYMERIC MICROGEL PREPARED FROM POLYMERIZING EPOXY-CONTAINING MONOMER IN THE PRESENCE OF AN ACID

This is a division of application Ser. No. 482,117, filed Apr. 4, 1983, now U.S. Pat. No. 4,540,740.

BACKGROUND OF THE INVENTION

1. Field of the Invention

The present invention relates to polymeric microgel and to its method of preparation. More particularly, this invention relates to the preparation of polymeric microgel by aqueous emulsion polymerization techniques.

2. Brief Description of the Prior Art

Microgel is a polymeric particle of colloidal dimensions, for example, about 0.001 to 10 microns in diameter, which is gelled or crosslinked. The microgel is prepared by dispersion polymerization techniques in which the crosslinked polymer particles are comparable in size to non-crosslinked polymer particles prepared by dispersion polymerization techniques. Strong solvents may cause the microgel to swell but they will not dissolve the particles. Microgels have been known for some time and recently much work has been done involving their use in coating compositions.

The microgels significantly affect and modify the rheological properties of the coating compositions and/or the physical properties of the coatings into which they are incorporated. When formulated into coatings, microgel improves the spraying efficiency of the coatings enabling complete coverage in fewer passes of the spray gun. Microgel also improves the sag resistance of the coating and the metallic pigment pattern control of coating compositions using metallic pigments such as aluminum flake. Typical patents describing microgel and its method of preparation are as follows:

British Pat. No. 967,051 and U.S. Pat. No. 4,290,932 disclose a process for preparing a polymeric microgel via aqueous emulsion polymerization techniques. The polymer is prepared by polymerizing a mixture of vinyl monomers, at least one of which contains at least two ethylenically unsaturated double bonds, via aqueous emulsion polymerization techniques to form the resulting crosslinked polymeric microgel.

U.S. Pat. No. 4,296,013 discloses vinylidene chloride polymer microgels. The microgels are obtained by emulsion polymerizing vinylidene chloride, a copolymerizable ethylenically unsaturated monomer such as ethyl methacrylate, and about 0.1 to 10 parts by weight of a copolymerizable crosslinking polyfunctional comonomer such as 1,4-butanediol diacrylate.

U.S. Pat. No. 4,209,435 discloses a process for preparing a stable aqueous dispersion of polymer particles. The method comprises the steps of forming a sterically stabilized dispersion in a non-aqueous liquid of a first polymer which may be crosslinked and is insoluble in the non-aqueous liquid and in water; polymerizing monomer in the same non-aqueous liquid in the presence of particles of the first polymer and of a steric stabilizer so as to form a second polymer which is soluble in the aqueous medium; and transferring the resultant polymer particles from the non-aqueous medium to the aqueous medium.

U.S. Pat. No. 4,322,328 discloses sterically stabilized aqueous polymer dispersions of at least 20 percent solids content are made by free radical initiated polymerization of monomers in an aqueous medium at a temperature at least 10° C. higher than the glass transition temperature of the polymer to be formed, in the presence of a compound which is soluble in the aqueous medium and which contains in the molecule a polymer component of molecular weight of at least 1000 which is solvatable by the aqueous medium and an unsaturated group which can copolymerize with the monomers.

U.S. Pat. No. 4,324,714 discloses coating compositions containing crosslinked vinylidene chloride polymer microgel powders which are prepared in accordance with U.S. Pat. No. 4,296,013 mentioned above.

SUMMARY OF THE INVENTION

In accordance with the present invention, a process for preparing a polymeric microgel is provided. The process comprises polymerizing a mixture of polymerizable ethylenically unsaturated monomers which contain a 1,2-epoxy group-containing ethylenically unsaturated monomer via aqueous emulsion polymerization techniques in the presence of acid. The 1,2-epoxy group-containing vinyl monomer and the acid are present in amounts sufficient to form microgel particles.

The invention also provides for an emulsion containing polymeric microgel particles which are obtained by the process described above.

The invention also provides for a dispersion in which the above-described aqueous emulsion is inverted into organic solvent and the resultant dispersion at least partially dehydrated.

DETAILED DESCRIPTION

The microgels are prepared in the presence of acid via aqueous emulsion polymerization techniques. The polymerization techniques are well known in the art and are described, for example, in EMULSION POLYMERIZATION by D. C. Blackley, Halsted Press, a division of John Wiley & Sons, New York-Toronto 1975. The aqueous emulsions prepared in accordance with the invention contain discrete particles of polymeric particles. Usually, the emulsions will have resin solids content of from about 15 to 70 percent; the percentages by weight being based on total weight of the emulsion. Usually, the particles will have a particle size of 10 microns or less, preferably 0.005 to 10 microns, more preferably 0.01 to 1 microns; the particle size being determined by light scattering techniques. The microgel particles will be gelled or crosslinked as evidenced by their insolubility in methyl amyl ketone. When the microgel prepared in accordance with the invention is dried, placed in a Soxhlet Extractor and extracted 12 hours with acetone, at least 30, preferably at least 40, more preferably at least 50, and most preferably at least 70 percent by weight of the microgel is not extracted.

The polymerizable ethylenically unsaturated monomers which are polymerized in accordance with the present invention are preferably vinyl monomers. Examples of vinyl monomers are esters of organic acids such as alkyl acrylates and methacrylates containing from 1 to 18 carbon atoms in the group. If used, these particular vinyl monomers will constitute from about 0 to 90, preferably about 40 to 80 percent of the total monomer charge; the percentage by weight based on total monomer weight.

Also, aromatic vinyl monomers such as styrene, alpha-methylstyrene, alpha-chlorostyrene and vinyl toluene may be used. When used, these monomers will constitute from about 0 to 50, preferably about 10 to 30 percent by weight of the total monomer charge.

Also present in the monomer charge is a 1,2-epoxy group-containing ethylenically unsaturated monomer, preferably a 1,2-epoxy-containing vinyl monomer such as glycidyl acrylate and glycidyl methacrylate, which are preferred. Examples of other monomers of this type are allyl glycidyl ether, N-glycidyl acrylamide and vinyl cyclohexane monoepoxide. The epoxy group-containing monomer is used in amounts which, in combination with the acid described below, will result in discrete microgel particles. Usually, the amount of epoxy monomer will be greater than 2, preferably greater than 5, and more preferably at least 10 percent by weight based on total weight of the monomer charge. The upper limit is not particularly critical and is usually governed by cost. Preferably, the upper limit of epoxy monomer is about 50, more preferably about 30 percent by weight, based on total weight of the monomer charge. This particular monomer results in crosslinking of the polymerizing mixture of monomers and the formation of the microgel. Amounts less than 2 percent by weight result in insufficient crosslinking.

Besides the monomers mentioned above, other different copolymerizable monomers containing polymerizable ethylenic unsaturation can also be used. Examples of such vinyl monomers are divinyl monomers such as glycol diacrylates and dimethacrylates, for example, ethylene glycol dimethacrylate. Examples of other vinyl monomers are organic nitriles such as acrylonitrile and methacrylonitrile; allyl monomers such as allyl chloride and allyl cyanide; and monomeric dienes such as 1,3-butadiene and 2-methyl-1,3-butadiene. When used, the monomer will constitute from 0 to 30 percent by weight of the monomer charge.

To effect crosslinking, the presence of acid is necessary. By the presence of acid is meant the acid is present with the polymerizing mixture of monomers or the monomers can be first polymerized and the acid post-added and the crosslinking brought about by subsequent heating, for example. Preferably, the acid is present during the polymerization of the monomers. The acid is preferably a strong acid so that crosslinking can occur in a relatively short period of time. Preferably, the acid will have a pKa of −10 to 4. Preferably, the pH of the medium in which crosslinking occurs is less than 2.5, more preferably less than 2. Examples of suitable acids (which include monoacids and polyacids) are inorganic acids such as sulfuric acid and phosphoric acid, and organic acids such as organic sulfonic acids, which are preferred. Specific organic acids are malonic acid, para-toluenesulfonic acid and dinonylnaphthalene disulfonic acid. Also, Lewis acids such as boron trifluoride can be used.

Besides the acids mentioned above, the acid functionality can also be associated with one of the polymerizable ethylenically unsaturated monomers such as sulfonic acid-containing vinyl monomers. Examples of such acids are vinyl sulfonic acid, acrylamidipropane sulfonic acid and sulfoethyl methacrylate. Preferably, the acid will constitute a mixture of externally added acid such as para-toluenesulfonic acid and an acid containing ethylenically unsaturated monomer such as sulfoethyl methacrylate. The amount of acid which is used is that amount which, in combination with the epoxy monomers mentioned above, will bring about the desired microgel formation. This will depend on the strength of the acid, the identity and the amount of epoxy monomer. Usually, the acid will constitute from 0.01 to 15, preferably from 0.1 to 5, more preferably 0.1 to 2 percent by weight of the vinyl monomer.

The microgel particles prepared as described above can be incoporated into water-based coating compositions by simply mixing the emulsion with the coating composition. Alternately, the microgel could be spray dried or filtered, or coagulated and filtered from the aqueous emulsion and dried, and mixed into the water-based coating composition or an organic solvent-based coating composition. Also, the aqueous emulsion of the microgel could be inverted into organic solvent, the water being removed by azeotropic distillation. All or a portion of the water could be removed (dehydrated or partially dehydrated), and the resulting dispersion mixed with the appropriate coating composition.

The amount of microgel solids which is present in the coating composition is generally from about 1 to 80 percent by weight, preferably from about 5 to 70 percent by weight, based on total weight of the coating composition. The use of the microgel is particularly desirable in coating compositions containing metallic flakes, particularly aluminum flake, in that the microgel results in proper orientation of the pigment resulting in a lustrous shiny appearance with excellent flop, distinctness of image and high gloss. By flop is meant the visual change in brightness or lightness of a metallic coating with a change in viewing angle, i.e., change from 180 to 90 degrees. The greater the change, the better the flop. Flop is important because it accentuates the lines of a curved surface such as an automobile body. Also, the microgel is particularly effective in high solids coating compositions, that is, coating compositions which have a total solids content of about 40 to 80 percent by weight. The microgel has been found to provide particularly good sag resistance to such high solids coating compositions. Also, the microgel is particularly desirable for use in the base coat of a clear-over-color system in which a clear top coat is applied to a pigmented or colored base coat. The microgel can also be present in the clear coat. If desired, the clear top coat can be applied without first curing the base coat (wet-on-wet application).

Examples of coating compositions suitable for use with the microgel of the present invention are thos described in U. S. Pat. Nos. 4,025,474; 4,055,607; 4,115,472; 4,180,489; 4,242,384; 4,268,547; 4,220,679 and 4,290,932.

The invention is illustrated by, but not limited to, the following examples in which parts and percentages are by weight unless otherwise indicated.

EXAMPLES

The following examples show the preparation of discrete polymeric microgel particles. A mixture of vinyl monomers including glycidyl methacrylate is polymerized by aqueous emulsion polymerization techniques in the presence of para-toluenesulfonic acid. After completion of the polymerization, the emulsion is inverted with organic solvent and the resulting dispersion dehydrated by azeotropic distillation. For the purposes of comparison, a microgel was prepared in accordance with Example 12 of U.S. Pat. No. 4,290,932 and Example II of U.S. Pat. No. 4,147,688.

EXAMPLE 1

In this example, the monomer mixture was pre-emulsified and a portion was polymerized to form a seed dispersion of polymer followed by addition thereto and polymerization of the remaining portion of the monomer charge. The following kettle charge and feeds were used in the polymerization.

| Ingredients | Parts by Weight (in grams) |
| --- | --- |
| Kettle Charge | |
| Deionized water | 3624.3 |
| AEROSOL OT[1] | 25.8 |
| TRITON N101[2] | 75.2 |
| Para-toluenesulfonic acid | 12.4 |
| Feed A | |
| Ammonium persulfate | 15.5 |
| Deionized water | 375.6 |
| Feed B (Pre-Emulsion)* | |
| Methyl methacrylate | 1406.7 |
| Styrene | 560.5 |
| Glycidyl methacrylate | 382.1 |
| Butyl acrylate | 558.1 |
| 1-dodecanethiol | 14.9 |
| Deionized water | 1251.7 |
| TRITON N101 | 76.3 |
| AEROSOL OT | 6.4 |
| Feed C | |
| 2-sulfoethyl methacrylate | 21.0 |
| Deionized water | 629.9 |
| AEROSOL OT | 25.2 |
| TRITON N101 | 25.1 |

[1]Dioctylsulfosuccinate sodium salt (100 percent active), available from American Cyanamid Company.
[2]Nonylphenol-ethylene oxide condensate, available from Rohm and Haas Company.
*Feed B was pre-emulsified by adding the mixture of vinyl monomers to an agitated solution of the 1-dodecanethiol, the surfactants and the deionized water.

The kettle charge was heated to a temperature of 85° C. under a nitrogen blanket and with agitation in a reaction vessel suitable for aqueous emulsion polymerization. Feed B (150 grams) was added to the reaction vessel and the temperature held for 5 minutes at 85° C. followed by the addition of Feed A and holding the reaction mixture temperature at 83°-85° C. for 30 minutes. One-half of Feed B (2128.35 grams) was added to the reaction mixture over a 1½ hour period while maintaining the reaction mixture temperature at about 84° C. The remaining portion of Feed B was mixed with Feed C and the mixture added to the reaction vessel over a 1½ hour period while maintaining the temperature at 83°-84° C. At the completion of addition, the reaction mixture was held for 4 hours at 84°-86° C. to complete the polymerization and the crosslinking reaction. Upon cooling, the emulsion was examined and found to contain discrete microgel particles. The particles are insoluble in methyl amyl ketone. The emulsion had a resin solids content of about 35 percent by weight, and a particle size (as determined by light scattering) of 970 Angstroms.

The aqueous emulsion prepared as described above was inverted with organic solvent and water removed by azeotropic distillation as follows:

| Ingredients | Parts by Weight in grams |
| --- | --- |
| Initial Charge | |
| ISOPAR E[1] | 614.3 |
| DOWANOL PM[2] | 356.3 |
| Methyl amyl ketone | 251.9 |
| Aqueous emulsion | 518.6 |
| Feed D | |
| ISOPAR E | 352.0 |
| DOWANOL PM | 452.3 |
| Feed E | |
| Methyl amyl ketone | 82.1 |
| Feed F | |
| Isopropanol | 100.7 |

[1]High boiling naphtha (boiling point 125° C.), available from Exxon Company.
[2]Monomethyl ether of propylene glycol available from Dow Chemical Company.

The initial charge was added to a reaction vessel equipped with mechanical agitation, a thermometer, a Dean-Stark trap, and reflux condenser. The initial charge was heated to a temperature of about 40° C. under a vacuum of 80 millimeters of mercury, at which time distillation commenced. The distillate collected to the Dean-Stark trap consisted of two layers. The bottom layer, which are composed of a water-DOWANOL PM mixture, was removed during the course of the distillation, while the top layer was continuously returned to the flask. Feed D was added incrementally during the course of the reaction in order to control the viscosity of the charge. When all of the water had been removed, the pot temperature had risen to 53° C. and the viscosity of the bluish translucent dispersion had dropped considerably. At this point, Feed E was added and organic solvent was removed until the solids of the product was about 17 percent. The product was quite viscous at this point. The heat and vacuum were then shut off, Feed F was added and the product cooled to room temperature. The product was filtered to yield a bluish colored dispersion with a resin solids content of 14.3 percent, a viscosity of about 800 centipoise (Brookfield #4 at 50 rpm), and a water content of 0.18 percent.

EXAMPLE 2

The following example shows the preparation of discrete polymeric microgel particles by aqueous emulsion polymerization techniques in a manner similar to that of Example 1 but in which the mixture of monomers was not pre-emulsified. The following kettle charge and feeds were used in the polymerization.

| Ingredients | Parts by Weight (in grams) |
| --- | --- |
| Kettle Charge | |
| Deionized water | 771.6 |
| AEROSOL OT | 9.8 |
| TRITON N101 | 17.2 |
| Para-toluenesulfonic acid | 2.1 |
| Feed A | |
| Ammonium persulfate | 2.0 |
| Deionized water | 244.3 |
| TRITON N101 | 16.7 |
| Feed B | |
| 2-sulfoethyl methacrylate | 8.0 |
| Deionized water | 244.9 |
| Feed C | |
| Methyl methacrylate | 274.5 |
| Styrene | 107.1 |
| Glycidyl methacrylate | 72.1 |
| Butyl acrylate | 104.9 |

The kettle charge was heated to 87° C. with agitation under a nitrogen blanket in a reaction vessel suitable for aqueous emulsion polymerization. Thiry (30) ml. of Feed C (about 5 percent) was added to the reaction vessel and the temperature held at 85°-87° C. for about 5 minutes followed by the addition of 25 ml. (about 10 percent) of Feed A. The temperature of the reaction mixture was held between 78°-85° C. for about 20 minutes. Feed B and the remaining portions of Feeds A and C are then started and continued slowly and simultaneously while maintaining the temperature of the reaction mixture between 75°-88° C. The additions of Feeds B and C were completed in about 4 hours and the addition of Feed A was completed in about 4½ hours. At the completion of the additions of Feeds A, B and C, the reaction mixture was held between 87°-88° C. for about 5 hours to complete the polymerization and the crosslinking reaction.

Upon cooling, the emulsion was examined and found to contain discrete microgel particles. The particles were insoluble in methyl amyl ketone. The emulsion has a resin solids content of about 33 percent and a particle size (determined by light scattering) of about 958 Angstroms.

The emulsion was inverted into organic solvent as follows:

| Ingredients | Parts by Weight (in grams) |
|---|---|
| Initial Charge | |
| Butanol | 339.8 |
| ISOPAR E | 357.8 |
| Methyl amyl ketone | 151.5 |
| Aqueous emulsion | 446.2 |

The initial charge was heated to distillation temperature (40° C.) with agitation under a vacuum of 120 millimeters of mecury. Heating was continued for about 2½ hours, resulting in the distillation of about 285 ml. of water which was removed through a Dean-Stark trap. The reaction mixture became viscous and the presence of predominantly organic solvent was observed in the distillate. The reaction mixture was then thinned with 120.2 grams of ISOPAR E and organic solvent was removed via distillation for about 20 minutes under a vacuum of about 90 millimeters of mercury. The reaction mixture became viscous and was thinned with an additional 121.8 grams of ISOPAR E, followed by continued vacuum distillation. When the reaction mixture became viscous again, another 120.3 grams of ISOPAR E was added to the reaction mixture and the vacuum distillation continued for about another 15 minutes. A total of about 875 ml. of organic solvent were distilled. The reaction mixture was then cooled and thinned with 15.5 grams of methyl amyl ketone and filtered through a nylon bag. The resulting non-aqueous dispersion was a translucent blue color indicating that the microgel particles (25.3 percent resin solids) were dispersed in the organic solvent mixture (42 percent by weight methyl amyl ketone and 58 percent by weight ISOPAR E).

EXAMPLE 3

The following example shows the preparation of discrete polymeric microgel particles by aqueous emulsion polymerization techniques in a manner similar to that of Example 2 with the exception that the monomer mixture was continuously added to the reaction mixture without first forming a seed dispersion of polymer. The following kettle charge and feeds were used in the polymerization.

| Ingredients | Parts by Weight (in grams) |
|---|---|
| Kettle Charge | |
| Deionized water | 1100.9 |
| AEROSOL OT | 9.0 |
| TRITON N101 | 32.2 |
| Para-toluenesulfonic acid | 3.0 |
| Feed A | |
| Deionized water | 234.4 |
| Ammonium persulfate | 2.1 |
| Feed B | |
| Styrene | 190.1 |
| Methyl methacrylate | 193.7 |
| Glycidyl methacrylate | 67.5 |
| Butyl acrylate | 110.1 |

The kettle charge was heated to 82° C. with agitation under a nitrogen blanket in a reaction vessel suitable for aqueous emulsion polymerization. About 25 ml. of Feed A was added to the reaction vessel followed by the simultaneous and continuous addition of Feed B and the remaining portion of Feed A while maintaining the temperature of the reaction mixture at about 82°-89° C. The addition of Feed B was completed in about 4 hours and the addition of Feed A was completed in about 4½ hours. At the completion of the additions of Feeds A and B, the reaction mixture was held at 82°-88° C. for about 5½ hours to complete the polymerization and crosslinking reaction.

The reaction mixture was cooled and filtered and upon examination was found to contain discrete microgel particles which were insoluble in methyl amyl ketone. The emulsion had a resin solids content of about 29 percent and a particle size of about 950 Angstroms.

The aqueous emulsion was inverted into organic solvent as follows:

| Ingredients | Parts by Weight (in grams) |
|---|---|
| Initial Charge | |
| Butanol | 201.0 |
| ISOPAR E | 201.5 |
| Aqueous emulsion | 212.4 |

The initial charge was heated to distillation temperature (37° C.) under 180 millimeters of mercury. Distillation was continued for about 2½ hours resulting in the removal of 125 ml. of water through a Dean-Stark trap. The pressure was reduced to 140 millimeters of mercury and distillation continued (temperature of the contents in the reaction vessel 64° C.) and about 75 ml. of organic solvent distilled from the contents in the reaction vessel. The vacuum was released and the reaction flask contents thinned with 100 ml. of methyl amyl ketone. The contents of the reaction vessel were then heated to 72° C. under 140 millimeters of mercury and an additional 125 ml. of organic solvent distilled. The contents of the reaction vessel were then cooled and filtered. The microgel particles (16.3 percent resin solids) were dispersed in the organic solvent mixture as evidenced by a nearly transparent dispersion with a blue haze.

COMPARATIVE EXAMPLE 4

For the purpose of comparison, a microgel was prepared in accordance with Example 12 of U.S. Pat. No. 4,290,932. This microgel was prepared by polymerizing a mixture of acrylic monomers in aqueous medium.

Crosslinking was caused by the presence of a triacrylate in the monomer charge. The microgel was prepared as follows:

| Ingredients | Parts by Weight in grams |
|---|---|
| Initial Charge | |
| Deionized water | 1191.0 |
| AEROSOL 18[1] | 89.9 |
| AEROSOL AY-65[2] | 45.4 |
| Sodium bicarbonate | 7.5 |
| Feed A | |
| Ammonium persulfate | 7.6 |
| Deionized water | 216.8 |
| Feed B | |
| Styrene | 359.3 |
| Hydroxypropyl methacrylate | 331.4 |
| 2-Ethylhexyl acrylate | 273.7 |
| Butyl methacrylate | 331.4 |
| Acrylic acid | 28.5 |
| Trimethylolpropane triacrylate | 115.3 |

[1]Disodium N—octadecyl sulfosuccinate.
[2]Sodium diamyl sulfosuccinate.

To a reaction flask equipped with a condenser, thermometer and agitator the initial charge was added and heated under a nitrogen blanket with agitation to 84° C. About 25 milliliters of Feed A was added to the reaction vessel and the temperature brought to 84° C. Feed A was then added in a substantially continuous manner over a period of about 3 hours. At the same time, Feed B was initiated and continued over a period of about 2½ hours. At the completion of Feed A, the reaction mixture was held for 30 minutes at 84° C., cooled to 35° C. and filtered through a nylon bag. The aqueous acrylic emulsion had a solids content of 49.6 percent (theoretical 50.5 percent).

COMPATATIVE EXAMPLE 5

For the purpose of comparison, a microgel was prepared in accordance with Example II of U.S. Pat. No. 4,147,688. This microgel was prepared by polymerizing a mixture of acrylic monomers in organic solvent by non-aqueous dispersion polymerization techniques.

To a 5-liter flask equipped with an up and over condenser, agitator, thermometer and heating mantle were charged 1250 grams of heptane, 540 grams of ISOPAR H (a mixed aliphatic hydrocarbon having an initial boiling point of 350° F. (177° C.) and a dry point of 371° F. (188° C.) with 90 percent distilling between 353°-357° F. (178°-181° C.), available from Humble Oil and Refining Company), 50 grams of methyl methacrylate, 10 grams of the dispersion stabilizer solution and 4 grams of azobis(isobutyronitrile).

The dispersion stabilizer solution used contained 50.3 percent solids (viz., dispersion stabilizer) and the dispersion stabilizer was a polymer prepared by interpolymerizing 45.4 percent methyl methacrylate, 4.2 percent glycidyl methacrylate, 0.9 percent methacrylate acid, and 49.5 percent of a reaction product of 89.2 percent poly-12-hydroxystearic acid and 10.8 percent glycidyl methacrylate. The solvent of the dispersion stabilizer solution comprised 52.1 percent butyl acetate, 40.0 percent VM&P naphtha and 7.9 percent toluene.

The mixture was heated to reflux (about 103° C.) and held for about 30 minutes. Then over a period of about 3 hours was added a premix consisting of 1288 grams of methyl methacrylate, 70 grams of glycidyl methacrylate, 42 grams of methacrylic acid, 4.2 grams of ARMEEN DMCD (dimethyl cocoamine, available from Armour Chemical Company), 200 grams of the dispersion stabilizer solution, 14 grams of octyl mercaptan and 5.6 grams of azobis(isobutyronitrile). After this addition was completed, reflux was continued for an additional 30 minutes and then an additional 2.8 grams of azobis(isobutyronitrile) were added. Reflux was then continued for another one hour and the mixture was then cooled and filtered.

The resultant polymeric dispersion consisting essentially of crosslinked acrylic polymer particles (i.e., microgel particles) had a total solids content determined at 150° C. of about 43–45 percent by weight.

RESIN BINDER AND PAINT PREPARATION

The following examples show the formulation of a paint with the microgel of Example 1. The paint was organic solvent-based, containing an acrylic resin binder and powdered aluminum. For the purposes of comparison, similar paints were formulated with microgels prepared in accordance with the teachings of U.S. Pat. No. 4,290,932 (see Comparative Example 4, supra) and U.S. Pat. No. 4,147,688 (see Comparative Example 5, supra). To act as a control, a paint without any microgel was also prepared.

ACRYLIC RESIN BINDER

An acrylic resin binder was prepared as follows:

| Ingredients | Parts by weight in grams |
|---|---|
| Initial Charge | |
| n-butanol | 529.9 |
| 2-Ethoxyethyl acetate | 525.5 |
| Tertiary-butyl peroctoate | 25.0 |
| Feed A | |
| Styrene | 470.5 |
| Butyl methacrylate | 410.3 |
| n-dodecyl mercaptan | 61.4 |
| Feed B | |
| 2-Ethylhexyl acrylate | 379.8 |
| Hydroxyethyl acrylate | 325.3 |
| Acrylic acid | 34.4 |
| Tertiary-butyl peroctoate | 159.6 |
| Feed C | |
| Tertiary-butyl peroctoate | 10.6 |
| 2-Ethoxyethyl acetate | 22.3 |

The initial charge was heated in a reaction vessel with agitation to 106° C. Feeds A and B were initiated simultaneously and continued in a substantially continuous manner over a period of about 4 hours while maintaining the reaction temperature between 106°–116° C. At the completion of Feeds A and B, Feed C was initiated and continued in a continuous manner over a 1½ hour period while maintaining the reaction temperature at about 116°–117° C. At the completion of Feed C, the reaction mixture was held for 15 minutes at 117° C., cooled and filtered. The resultant acrylic resin had a solids content of 57.2 (theoretical 57.9).

PAINTS

EXAMPLE I

A silver metallic paste was prepared by thoroughly mixing 2.25 parts of powdered aluminum and 2.25 parts of xylene. To this mixture was added 1.70 parts of acetone, 16.46 parts of methylolated melamine-formaldehyde resin, and 4.11 parts of isobutanol, and the resulting mixture thoroughly mixed.

To 26.77 parts by weight of this aluminum paste was added with thorough mixing 58.4 parts by weight of the acrylic resin binder described above, 45.6 parts by weight of the microgel of Example 1 and 1.1 parts by weight of the catalyst CYCAT 4040 which is a 40 percent by weight solution of para-toluenesulfonic acid in isopropanol and is available from American Cyanamid. The resulting paint had a solids content of 44.4 percent and a spray viscosity of 19.7 seconds as measured with a No. 4 Ford cup.

COMPARATIVE EXAMPLE II

A second paint was prepared using an organic solvent-based microgel of Comparative Example 5. This paint was prepared by mixing together 58.40 parts by weight of the acrylic resin described above, 15.50 parts by weight of the organic solvent-based microgel (6.80 parts by weight resin solids) and 26.77 parts by weight of the aluminum pigment paste described above. The paint was thinned with 2-hexoxyethyl alcohol and blended with 1.1 parts by weight of CYCAT 4040. The resulting paint had a solids content of 49.9 percent and a spray viscosity of 18 seconds measured with a No. 4 Ford cup.

COMPARATIVE EXAMPLE III

A control paint with no added microgel was prepared by mixing together 58.4 parts of the acrylic resin described above (adjusted to 55 percent solids with a 1:1 mixture of n-butanol and 2-ethoxyethyl acetate) to 26.77 parts by weight of the aluminum pigment paste described above and 0.9 parts by weight of CYCAT 4040. The resulting paint had a spray viscosity of 23.8 seconds measured with a No. 4 Ford cup.

COMPARATIVE EXAMPLE IV

An acrylic resin binder incorporating the microgel of Comparative Example 4 was prepared in accordance with Example 12 of U.S. Pat. No. 4,290,932 as follows:

| Ingredients | Parts by Weight in grams |
|---|---|
| Initial Charge | |
| n-butanol | 491.1 |
| Ethoxyethyl acetate | 495.4 |
| Aqueous acrylic microgel of Comparative Example 4 | 526.3 |
| Tertiary-butyl peroctoate (50% in mineral spirits) | 20.2 |
| Feed A | |
| Styrene | 374.3 |
| Butyl methacrylate | 321.5 |
| n-dodecyl mercaptan | 47.6 |
| Feed B | |
| 2-Ethylhexyl acrylate | 302.1 |
| Hydroxyethyl acrylate | 258.0 |
| Acrylic acid | 27.3 |
| Tertiary-butyl peroctoate (50% in mineral spirits) | 126.9 |
| Feed C | |
| Tertiary-butyl peroctoate (50% in mineral spirits) | 7.6 |
| 2-Ethoxyethyl acetate | 12.2 |

To a reaction flask equipped with a condenser, thermometer, Dean-Stark trap and agitator was added the initial charge. The charge was heated to 91° C. to initiate a reflux. Feeds A and B were started simultaneously and continued over a period of about 4 hours while maintaining the temperature between 91°–94° C. and removing water through the Dean-Stark trap. At the completion of Feeds A and B, roughly about 240 ml. of water had been removed from the reaction vessel through the Dean-Stark trap. Feed C was initiated and continued for a period of about 1 hour while maintaining the reaction temperature between 104°111° C. At the completion of Feed C, about 262 ml. of water had been removed. Reflux was continued with the resultant removal of 268 total ml. of water. The reflux temperature had risen to 114° C. by the end of the reaction. The reaction mixture was cooled and filtered. The resulting resinous composition had a solids content of 59.8 percent (theoretical 58.9 percent) and contained about 17 percent by weight microgel.

To 26.77 parts by weight of the aluminum pigment paste described above were added 67.27 parts of the acrylic microgel resin (adjusted to a 55 percent solids with a 1:1 mixture of n-butanol and 2-ethoxyethyl acetate9. The paint was then reduced to a spray viscosity of 25 seconds as measured with a No. 4 Ford cup with a 1:1 mixture of xylene and acetone. The paint had a solids content of 52.9 percent.

The paints described above were sprayed onto pre-primed panels and baked at 265° F. (129° C.) for 20 minutes and observed for sag resistance and aluminum pigment pattern control (gloss and flop). With regard to the aluminum pigment pattern control, the paint employing the aqueous microgel of Example 1 was the best, followed in order by the paint employing the organic solvent-based microgel of Comparative Example 5, by the paint employing the aqueous microgel of the Comparative Example 4, and by the control. With regard to sag resistance, the paint employing the aqueous microgel of Comparative Example 4 was about equal to the paint employing the aqueous microgel of Example 1 which was slightly better than the paint employing the organic solvent-based microgel of Comparative Example 5 which was much better than the control.

I claim:

1. An emulsion of crosslinked polymeric particles which are obtained by polymerizing a mixture of polymerizable ethylenically unsaturated monomers which contain greater than 2 percent by weight of a 1,2-epoxy group-containing ethylenically unsaturated monomer, the percentage by weight being based on total weight of polymerizable ethylenically unsaturated monomers, via aqueous emulsion polymerization techniques in the presence of acid having a pKa of −10 to 4 and in which the pH of the aqueous medium is less than 2.5; the 1,2-epoxy group-contaning vinyl monomer and acid being present in amounts sufficient to form crosslinked polymeric particles.

2. The emulsion of claim 1 in which the acid is a sulfonic acid.

3. The emulsion of claim 2 in which the acid is para-toluenesulfonic acid.

4. The emulsion of claim 2 in which the acid is a sulfonic acid group-containing vinyl monomer.

5. The emulsion of claim 4 in which the sulfonic acid group-containing vinyl monomer has the structure:

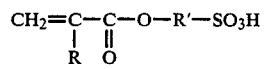

where R is selected from the class consisting of hydrogen and $C_1$ to $C_4$ alkyl, and R' is alkylene containing from 1 to 6 carbon atoms.

6. The emulsion of claim 1 in which the emulsion has a resin solids content of from about 15 to 70 percent.

7. A dispersion in which the aqueous emulsion of claim 1 is inverted into organic diluent and the resultant dispersion is at least partially dehydrated.

8. The dispersion of claim 7 which has a resin solids content of from about 2 to 65 percent.

9. A coating composition containing the dispersion of claim 7.

10. A coating composition containing the emulsion of claim 1.

* * * * *